United States Patent
Li

(10) Patent No.: US 9,350,546 B2
(45) Date of Patent: May 24, 2016

(54) METHOD AND SYSTEM TO DECRYPT PRIVATE CONTENTS

(71) Applicant: Tencent Technology (Shenzhen) Company Limited, Shenzhen (CN)

(72) Inventor: Danhua Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 252 days.

(21) Appl. No.: 14/040,394

(22) Filed: Sep. 27, 2013

(65) Prior Publication Data

US 2014/0195814 A1    Jul. 10, 2014

Related U.S. Application Data

(63) Continuation of application No. PCT/CN2013/079672, filed on Jul. 19, 2013.

(30) Foreign Application Priority Data

Jul. 20, 2012    (CN) .......................... 2012 1 0253204

(51) Int. Cl.
*H04L 29/06*    (2006.01)
*H04L 9/32*    (2006.01)
*G06F 21/45*    (2013.01)
*G06F 21/62*    (2013.01)

(52) U.S. Cl.
CPC .............. *H04L 9/3226* (2013.01); *G06F 21/45* (2013.01); *G06F 21/6209* (2013.01)

(58) Field of Classification Search
CPC .................................................... H04L 9/3226
See application file for complete search history.

(56) References Cited

U.S. PATENT DOCUMENTS

| 2004/0059945 | A1* | 3/2004 | Henson et al. ................ 713/201 |
| 2010/0058071 | A1* | 3/2010 | Hsueh ........................... 713/190 |

FOREIGN PATENT DOCUMENTS

| CN | 1713756 | A | 12/2005 |
| CN | 101895396 | A | 11/2010 |
| CN | 102123143 | A | 7/2011 |
| CN | 202014304 | U | 10/2011 |

(Continued)

OTHER PUBLICATIONS

Tencent Technology, ISRWO, PCT/CN2013/079672, Oct. 24, 2013, 8 pgs.

(Continued)

*Primary Examiner* — Brandon Hoffman
*Assistant Examiner* — Thong Truong
(74) *Attorney, Agent, or Firm* — Morgan, Lewis & Bockius LLP

(57) ABSTRACT

The invention discloses a method and a system to decrypt private contents stored in a device and the invention belongs to the field of computer security. The method may include: receiving a contents ID and a decrypting password from a first user; decrypting the encrypted private contents corresponding to the contents ID using the decrypting password; displaying the decrypted private contents when the decryption is successful; and displaying preset contents when the decryption is not successful. The system may include: a receiving module, a decryption module, and a display module. The present invention can improve the security of the private contents.

15 Claims, 8 Drawing Sheets

(56) References Cited

FOREIGN PATENT DOCUMENTS

| | | |
|---|---|---|
| CN | 102402664 A | 4/2012 |
| CN | 102750497 A | 10/2012 |

OTHER PUBLICATIONS

Tencent Technology, IPRP, PCT/CN2013/079672, Jan. 20, 2015, 6 pgs.

* cited by examiner

Private Contents Setup — 601

Select Private Contents To Be Protected — 603
- ☐ All Names
- ☐ Chat History
- ☐ Date & Time
- ☐ Pictures Submit  Cancel Set Password — 605

Set Password
_____
Re-enter Password
_____

Submit  Cancel

Set Guest Password — 607

Set Guest Password
_____
Re-enter Guest Password
_____

Submit  Cancel

Pre-Set Contents To Be Displayed — 609

Submit  Cancel

FIG. 6A

Chat Program Login — 630

Enter Password — 640
_____

Submit  Cancel

FIG. 6B

METHOD AND SYSTEM TO DECRYPT PRIVATE CONTENTS

RELATED APPLICATIONS

This application is a continuation application of PCT Patent Application No. PCT/CN2013/079672, entitled "METHOD AND SYSTEM TO DECRYPT PRIVATE CONTENTS" filed on Jul. 19, 2013, which claims priority to Chinese Patent Application No. 201210253204.7, "METHOD AND SYSTEM TO DECRYPT PRIVATE CONTENTS," filed on Jul. 20, 2012, both of which are hereby incorporated by reference in its entirety.

TECHNICAL FIELD

The present invention relates to the field of computer technology and particularly to a method and a system to decrypt and protect private contents stored in a device.

BACKGROUND

With the rapid development of mobile technology, mobile terminal such as smart phones have been widely used. More and more people are becoming increasingly concerned with information security of the mobile terminals. In using mobile terminals, users generate a large amount of private contents, which need to be protected to ensure information security.

The existing technology to protect private contents in a mobile terminal generally includes the following steps: the mobile terminal user installs in advance an encryption software on the mobile terminal and set up a password for the encryption software; as to the private contents in the mobile terminal, the user stores such contents in the encryption software; when a user attempts to view the private contents, the encryption software displays the password input interface to allow the user to enter a password; if the user enters the correct password, the encryption software displays the private contents to the user; if the user enters the wrong password, the encryption software displays an error message to the user. By following such steps, the existing technology provides protection to the private contents in the mobile terminal.

During the course of the current invention, the inventors find that the existing technology at least has the following problems:

When the encryption software is uninstalled from the mobile terminal, the protection to the private contents will be eliminated and any user can view the private contents in the mobile terminal, indicating that the level of information security is not high. In addition, the existing technology lacks flexibility to accommodate guest users because access to not only the private contents, but also other programs and contents in the mobile terminal is generally denied if a wrong password is entered.

SUMMARY

To improve information security and protection of privacy, the current invention provides a method and a system for the decryption of encrypted private contents in a device.

In accordance with some implementations, the method to decrypt encrypted private contents may comprise: receiving a contents ID and a decrypting password from a first user; decrypting the encrypted private contents corresponding to the contents ID using the decrypting password; displaying the decrypted private contents when the decryption is successful; and displaying preset contents when the decryption is not successful. The contents ID may provide guidance as to what encrypted private contents needs to be decrypted and the decrypting password may serve as the key for the decryption.

In accordance with some implementations, the preset contents that are displayed when the decryption is not successful may include: a blank user interface, or an artificial user interface displays preset private subjects not completely overlapping with the private contents. The private subjects may be completely different from the private contents, making no sensitive disclosure. Alternatively, the private subjects may include part, but not all of the private contents, blocking access to what the user considers important. The preset private subjects may be set up by the user or may be generated by a program.

In accordance with some implementations, before the step of decrypting the encrypted private contents corresponding to the contents ID using the decrypting password, the method may further include: determining whether the decrypting password is an invited guest password before decrypting the private contents, wherein when the decrypting password is the same as the invited guest password, the preset contents are displayed, and when the decrypting password is not the same as the invited guest password, the decryption of the encrypted private contents is carried out. The invited guest password may be set by the user or may be generated by a program.

In accordance with some implementations, the invited guest password or a plurality of invited guest passwords may be generated or provided and a corresponding relationship may be established between the contents ID and the invited guest password(s). To determine whether a decrypting password provided by a user is an invited guest password, the corresponding relationship between the contents ID and the invited guest password may be used to acquire the invited guest password(s) and compare the decrypting password to the invited guest password(s). If the decrypting password is the same as the invited guest password, then the decrypting password is the invited guest password; if the decrypting password is not the same as the invited guest password, then the decrypting password is not the invited guest password.

In accordance with some implementations, the method to decrypt encrypted private contents may further comprise: receiving an encrypting password from a user; identifying the private contents to be protected in the device; encrypting the private contents using the encrypting password and generating encrypted private contents; and storing a corresponding relationship between the encrypted private contents and the contents ID in a database to protect the private contents.

In some implementations, the user that provides the encrypting password may be the same user providing the decrypting password. The user providing the encrypting password initializes the encrypting process and selects what private contents need to be protected, thus establishing the basic level of protection for the private contents and providing the gateway for decryption and access for such contents. However, it is possible that the same user is not able to provide a decrypting password that matches the encrypting password, resulting in a failure to decrypt the encrypted private contents.

In some implementations, the user that provides the encrypting password may not be the same as the user providing the decrypting password. As indicated above, the user providing the decrypting password may or may not be able to decrypt the private contents, depending on whether the decrypting password matches the encrypting password.

In accordance with some implementations, the method to decrypt encrypted private contents may adopt a multi-prong approach so that (1) the decrypting password may be the same as the encrypting password, which may result in full decryption and display of the private contents; (2) the decrypting password may be different from the encrypting password, but the same as the invited guest password, which may result in display of preset contents; and (3) the decrypting password may be different from either the encrypting password or the invited guest password, which may result in display of the same or different preset contents.

In accordance with some implementations described below, the system for decrypting encrypted private contents may be incorporated into a mobile device, which has one or more processors and memory for storing the private contents and one or more programs. The system for decrypting encrypted private contents may be implemented with one or more programs, which use the memory and processors to carry out the steps to decrypt the encrypted contents.

In accordance with some implementations, the system for decrypting encrypted private contents may comprise: a receiving module configured to receive a decrypting password and a contents ID from a first user; a decryption module configured to decrypt the encrypted private contents corresponding to the contents ID using the decrypting password; and a display module configured to display the decrypted private contents when the decryption is successful, and display preset contents when the decryption is not successful.

In accordance with some implementations, the display module may comprise: a first display unit for displaying the decrypted private contents when the decryption is successful; and a second display unit for displaying the preset contents.

In accordance with some implementations, the system for decrypting encrypted private contents may further comprise: a processing module, configured to determine whether the decrypting password is an invited guest password before decrypting the private contents, wherein when the decrypting password is the invited guest password, the preset contents are displayed; and when the decrypting password is not the invited guest password, the decryption of the private contents is carried out.

In accordance with some implementations, the processing module may comprise: an acquiring unit, configured to acquire the invited guest password based on a corresponding relationship between the contents ID and the invited guest password; and a comparison unit, configured to compare the decrypting password to the invited guest password.

In accordance with some implementations, the processing module may further comprise: a third display unit, configured to display the preset contents when the decrypting password is the same as the invited guest password.

In accordance with some implementations, the system for decrypting encrypted private contents may further comprise: an encryption module, configured to receive an encrypting password from a second user, identify the private contents to be protected in the device, encrypt the private contents using the encrypting password and acquiring the encrypted private contents, and store a corresponding relationship between the encrypted private contents and the contents ID in a database.

According to the current invention, the system implemented in a device such as a mobile terminal may receive a decrypting password and a contents ID from a first user; attempt to decrypt the encrypted private contents corresponding to the contents ID using the decrypting password; and display the decrypted private contents when the decryption is successful, and display preset contents when the decryption is not successful. The private contents are stored in the device in an encrypted form; which may not be viewed by any user before decryption. If the decryption is successful, the decrypted private contents are displayed; if the decryption is not successful, then preset contents are displayed, wherein the preset contents does not overlap with any private contents. The method and system herein disclosed improve information security and protection of private contents.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

FIGS. 6A-6F are exemplary screenshots of how a mobile terminal receive encrypting settings and processes and displays private contents and preset contents in accordance with some implementations.

DETAILED DESCRIPTION

Figure 1:
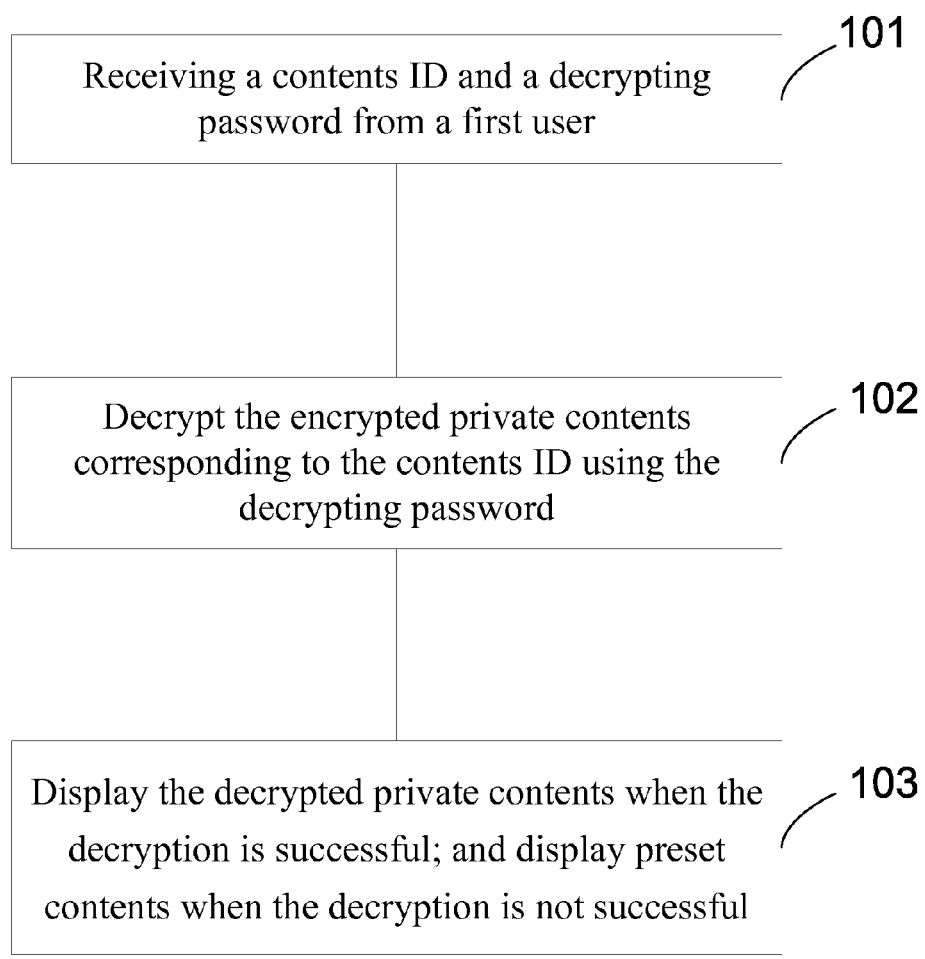
FIG. 1 is a flow chart of a method for decrypting encrypted private contents according to an embodiment.

FIG. 1 is a flow chart of a method for decrypting encrypted private contents according to an embodiment. As shown in FIG. 1, in an embodiment, a method for decrypting encrypted private contents include the following steps:

Step 101: Receive a contents ID and a decrypting password from a user.

Step 102: Decrypt the encrypted private contents corresponding to the contents ID using the decrypting password.

Step 103: Display the decrypted private contents when the decryption is successful; and display preset contents when the decryption is not successful.

The private contents here may refer to any kind of information the user considers to be private and/or need protection. As indicated in some embodiments below, the range of private contents to be protected may be defined by the user.

The contents ID is any kind of marker, signal, or digital key that links the private contents to certain information items such as the encrypting password or an invited guest password, as indicated by some embodiment shown below.

In the current embodiment, the system to decrypt encrypted private contents may receive a contents ID and a decrypting password from a user, decrypt the encrypted private contents corresponding to the contents ID using the decrypting password, and display certain contents based on the results of the decryption. In particular, when the decryption is successful, the decrypted private contents are displayed; when the decryption is not successful, certain preset contents are displayed. The private contents are stored in the device in an encrypted form; which may not be viewed by any user before decryption. If the decryption is successful, the decrypted private contents are displayed; if the decryption is not successful, then preset contents are displayed, wherein the preset contents does not overlap with any private contents. The method and system herein disclosed improve information security and protection of private contents.

Figure 2:
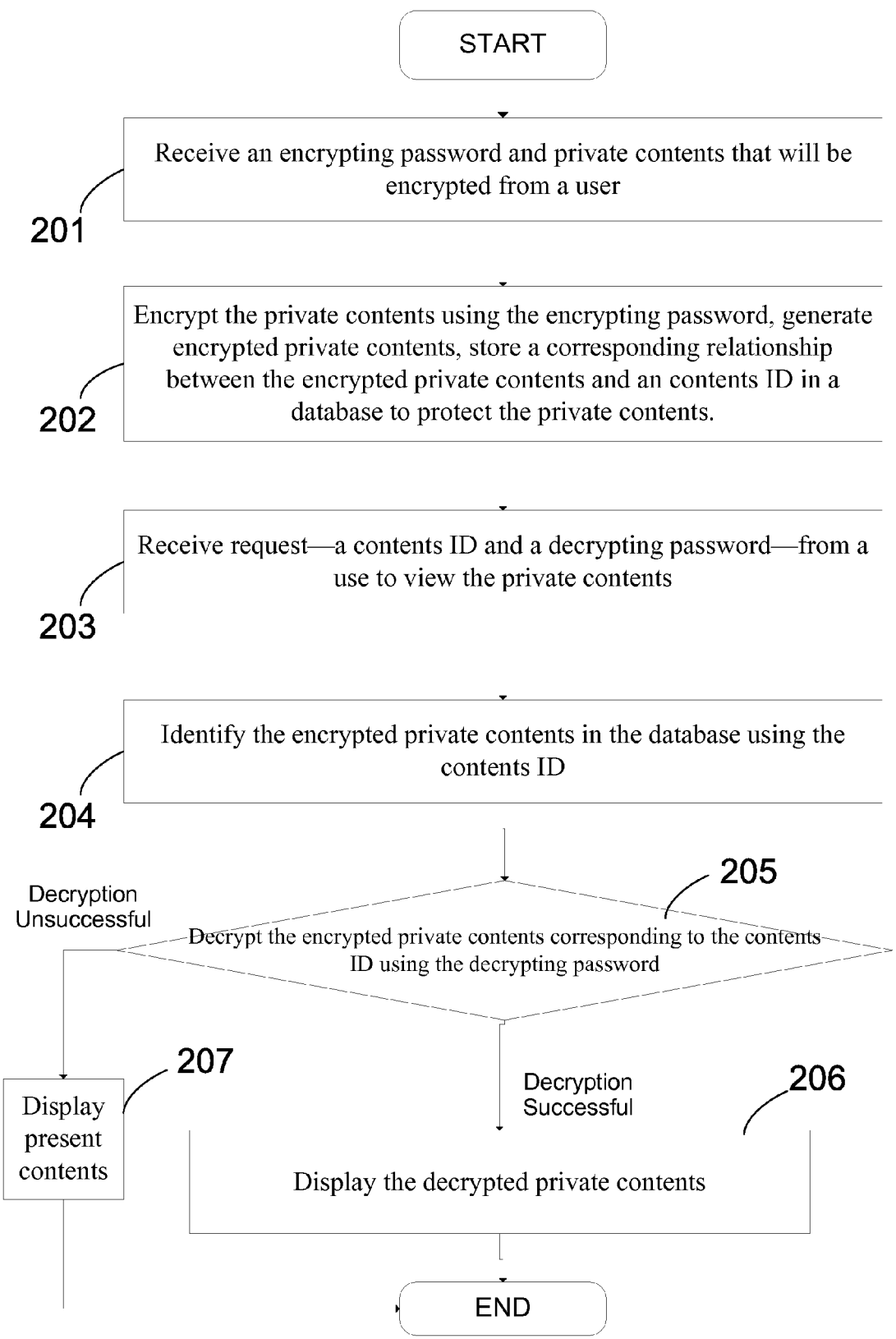
FIG. 2 is a flow chart of a method for decrypting encrypted private contents according to another embodiment.

FIG. 2 is a flow chart of a method for decrypting encrypted private contents according to another embodiment. According to the embodiment shown in FIG. 2, the method for decrypting encrypted private contents may include the following steps:

Step 201: The device, e.g. a mobile terminal, may receive an encrypting password and private contents that will be encrypted from a user.

In particular, the device may receive instruction from a user that certain private contents need to be identified and protected. Then the device may display an input interface and the user may enter an encrypting password through the input interface. The device may receive the encrypting password after the user confirms submission of the entry. The user may also identify what will be considered private contents and may enter certain private contents through the input interface or other programs. This may be achieved by a number of different approaches. For example, the user may identify that all names and dates are considered private contents to be protected and all such information items, either already in the device or entered in the future, will be encrypted; the user may also select certain information items (e.g. all entries submitted within a certain time period or all names that have been entered) already stored in the device to be private contents and encrypt such contents; the user may also specify that only certain information that are herein entered along with the encrypting password is considered private contents. In essence, the user may freely set the criteria and limitations for the private contents to be protected and may enter the private contents into the device together with the encrypting password if the user chooses to. After the user makes the selections and identifies the private contents to be protected and submits his/her choices, the device may receive the private contents that will be protected.

For instance, the device may display a button that may be used to prompt the user to set what private contents will be protected. When the user needs to protect certain private contents, the user may click the button to send instructions to the device to start the process. After the device receives the instructions regarding setting protection for private contents, the device may then display an input interface to the user. The user may use the input interface to enter an encrypting password, before confirming submission of the encrypting password by clicking a confirmation button in the input interface. After submission of the encrypting password, the user may select the private contents that need protection, before submitting the selection to the device. As indicated above, the selection and/or identification of private contents that need protection may take different forms and processes. While certain information may be considered "private" by the user, he/she may not consider all of such information need protection. The identification and selection of private contents to be protected allow the user the flexibility to choose what will be encrypted and displayed only after a successful decryption.

Step 202: The device, e.g. a mobile terminal, may encrypt the private contents using the encrypting password, generate encrypted private contents, and store a corresponding relationship between the encrypted private contents and a contents ID in a content database to protect the private contents.

In particular, the device may encrypt the private contents to be protected using the encrypting password, generate encrypted private contents corresponding to the private contents, enter a corresponding relationship (embodied by an entry) between the encrypted private contents and an contents ID in a content database to protect the private contents. The content database may include at least the contents ID and entry reflecting the relationship between the contents ID and the encrypted private contents. The contents database may further include the encrypted private contents. The contents ID may be entered by the user or generated by a program. The contents ID may be used as an identifying key to point to certain encrypted private contents so that when the decrypting password satisfies all the requirements, the correct encrypted private contents may be identified, decrypted, and displayed.

For example, the device receives from the user an encrypting password (PW 1), the identified private contents (Context 1) to be protected, and the contents ID (ID 1). Using the encrypting password PW 1, the device may encrypt the private contents Context 1 to be protected and generate encrypted private contents Context 11. After establishing a corresponding relationship between the contents ID (ID 1) and the encrypted private contents (Context 11), such relationship may be entered as entry into a content database, as shown in Table 1, which may also include possibly additional entries between ID 2 and Context 22, etc.

TABLE 1

| Contents ID | Encrypted Private Contents |
|---|---|
| ID 1 | Context 11 |
| ID 2 | Context 22 |
| ... | ... |

In this particular embodiment, the private contents are directly encrypted. Therefore, any user who attempts to acquire the private contents from the contents database will get the encrypted private contents. Such an approach enhances the security of the private contents. To view the private contents, the user may submit a request for the decryption and display of the private contents to the device.

Step 203: The device, e.g. a mobile terminal, may receive requests from a user to view the private contents; in particular, the device may receive a contents ID and a decrypting password from a user.

In particular, after receiving the request from a user to view the private contents, the device may display a log-in interface for the user. After the user enters and confirms submission of a decrypting password and a contents ID through the log-in interface, the device may verify the confirmation and receive the decrypting password and the contents ID, which may point to the encrypted private contents to be decrypted. As indicated above, the user that enters the encrypting password may or may not be the same user that enters the decrypting password. In addition, the contents ID may be entered by the user directly or may be generated by a program.

For instance, by requesting to use a certain program, the user may send an implicit request that he/she intends to access certain private contents and such a request to use the program is automatically accompanied by the provision of a contents ID so that the encrypted private contents may be properly identified.

Alternatively, for instance, the device may display a button that may be used to prompt the user to choose whether the user wants to view private contents that are protected. The user may click the button to send requests to the device that the user wants to view the private contents. After the receiving the requests, the device may display a log-in interface to the user. The user may use the long-in interface to enter a decrypting password and a contents ID for the encrypted private contents. The user may then confirm submission of the decrypting password and contents ID to the device by clicking a confirmation button in the log-in interface.

Step 204: The device, e.g. a mobile terminal, may identify the encrypted private contents in the database using the contents ID.

By inquiring and searching the contents database, as shown in Table 1, the device may identify the encrypted private contents based on the corresponding relationship between the contents ID and the encrypted private contents. As indicated above, since the contents ID may be entered manually or generated automatically by a program, the identification of the encrypted private contents may also be carried out after confirmation by the user or automatically.

Step 205: The device, e.g. a mobile terminal, may decrypt the encrypted private contents corresponding to the contents ID using the decrypting password. If the decryption is successful, then the device performs Step 206; if the decryption is unsuccessful, then the device performs Step 207.

In particular, if the user provides a correct decrypting password, e.g. the decrypting password being the same as the encrypting password for the encrypted private contents, then the device may be able to decrypt the encrypted private contents successfully and obtain the decrypted private contents, which may be properly displayed. If the user provides a wrong decrypting password, e.g. the decrypting password not being the same as the encrypting password for the encrypted private contents, then the device may not be able to decrypt the encrypted private contents successfully and obtain the decrypted private contents.

Step 206: The device, e.g. a mobile terminal, may display the decrypted private contents when the decryption is successful. End of operation.

In particular, after a successful decryption, the device may obtain the decrypted private contents, create a blank display interface, and load the decrypted private contents into the display interface. In such a manner, the decrypted private contents may be displayed.

For example, after the user enters a decryption password PW 1 and a contents ID ID 1, the device may receive the submission of PW 1 and ID 1 and search for the encrypted private contents using ID 1, as shown in Table 1. In such a manner, the encrypted private contents Context 11 may be properly identified in the contents database. Then the device may decrypt Context 11 using PW 1, which may or may not be correct. If PW 1 is the correct password, the decryption may be successful and the decrypted private contents Context 1 may be obtained by the device. The device may then create a blank interface, load Context 1 into the blank interface and properly display Context 1 and the interface.

It should be noted that the specific approach to display the decrypted private contents herein described may vary according to the specific programs and the nature of the private contents. The user may be able to set how the decrypted private contents, if obtained, will be displayed before or after the decryption is completed. For instance, the user may choose display only parts of the decrypted private contents or display the contents sequentially for the most effective view.

Step 207: Alternatively, the device, e.g. a mobile terminal, may display preset contents when the decryption is not successful. End of operation.

In particular, after an unsuccessful decryption, the device may create a blank display interface, and load preset private subjects obtained from the contents database into the display interface, wherein the present private subjects do not overlap with the private contents that are being protected. The preset private subjects may be authentic or fabricated. However, it is preferable that the preset private subjects do not overlap with any part of the private contents. Nevertheless, it is possible that the preset private subjects overlap with parts, but not all, of the private contents. The user, preferably the user entering the encrypting instructions, may be able to choose how to set the private subjects that are to be displayed once the decryption is not successful.

Alternatively, after an unsuccessful decryption, the device may display a preset blank interface. The blank interface may be configured so that it does not display any contents that may be considered private.

In addition, before carrying out Step 203, the user may enter preset private contents into the device, such as a mobile terminal. The device may receive the preset private contents and store such contents in the contents database.

In summary, in some implementations of the current invention, the device, e.g. a mobile terminal, may receive an encrypting password and the private contents selected by the user. The device may then encrypt the private contents using the encrypting password, generate encrypted private contents, and store a corresponding relationship between the encrypted private contents and a contents ID in a content database to protect the private contents. In addition, the device may receive request from a user to view the private contents; in particular, the device may receive a contents ID and a decrypting password from a user, identify the encrypted private contents in the database using the contents ID, and decrypt the encrypted private contents corresponding to the contents ID using the decrypting password. If the decryption is successful, then the device displays the private contents; if the decryption is unsuccessful, then the device displays preset contents. The private contents are stored in the device in an encrypted form; which may not be viewed by any user before decryption. If the decryption is successful, the decrypted private contents are displayed; if the decryption is not successful, then preset contents are displayed, wherein the preset contents does not overlap with any private contents. Thus, the method herein disclosed improves information security and protection of private contents.

Figure 3:
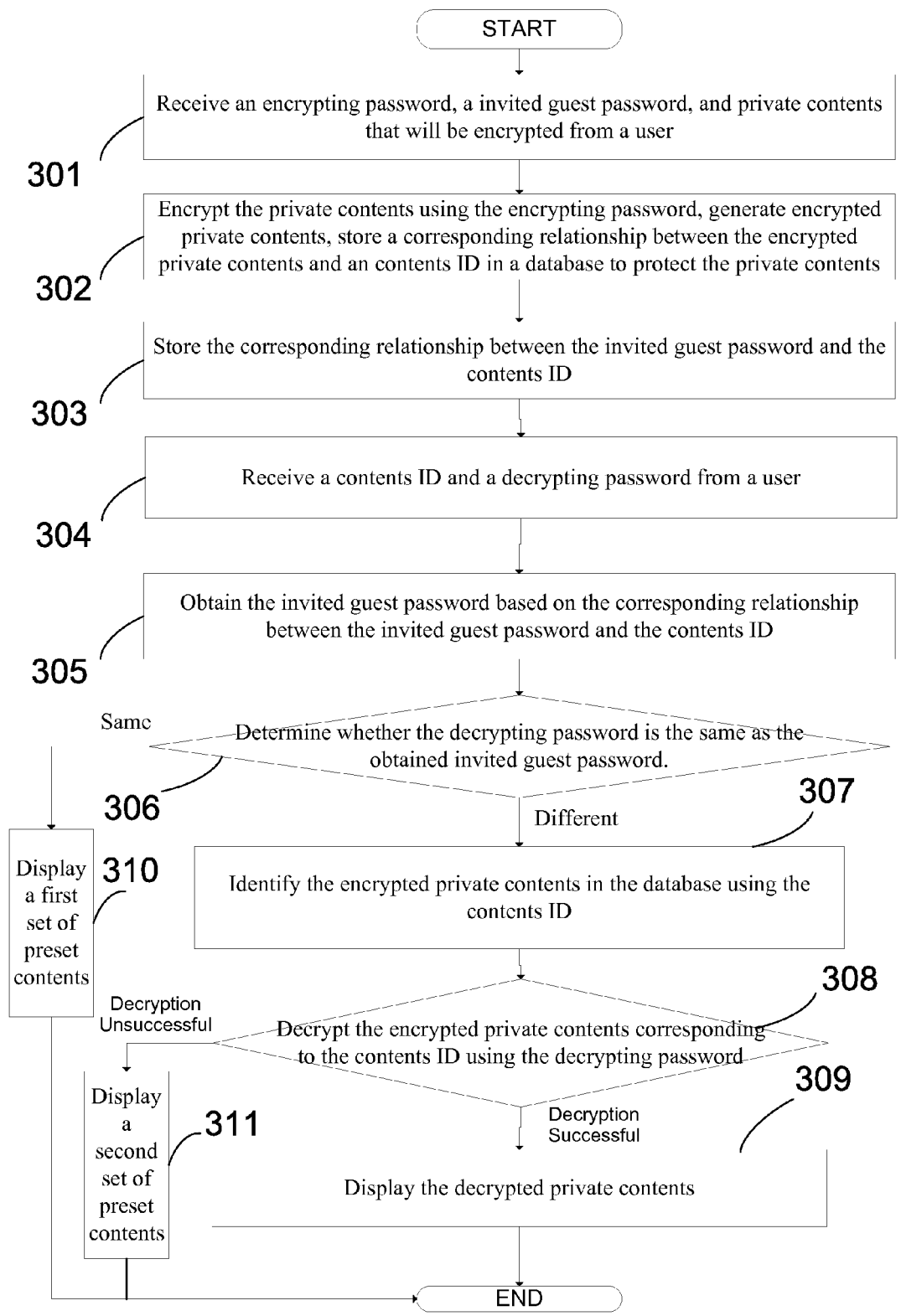
FIG. 3 is a flow chart of a method for decrypting encrypted private contents according to another embodiment.

FIG. 3 is a flow chart of a method for decrypting encrypted private contents according to another embodiment. According to the embodiment shown in FIG. 3 the method for decrypting encrypted private contents may include the following steps:

Step 301: The device, e.g. a mobile terminal, may receive an encrypting password, an invited guest password, and private contents that will be encrypted from a user.

In particular, the device may receive instruction from a user that certain private contents need to be identified and protected. Then the device may display an input interface and the user may enter an encrypting password and an invited guest password through the input interface. The device may receive the encrypting password after the user confirms submission of the entry. The user may also identify what will be considered private contents and may enter certain private contents through the input interface or other programs. This may be achieved by a number of different approaches. For example, the user may identify that all names and dates are considered private contents and all such information item, either already in the device or entered in the further, will be encrypted; the user may also select certain information items (e.g. all entries submitted within a certain time period or all names that have been entered) already stored in the device to be private contents and encrypt such contents; the user may also specify that only certain information that are herein entered along with the encrypting password is considered private contents. In essence, the user may freely set the criteria and limitations for the private contents and may enter the private contents into the device together with the encrypting password if the user chooses to. After the user makes the selections and identifies the private contents and submits his/her choices, the device may receive the private contents that will be protected.

For instance, the device may display a button that may be used to prompt the user to set what private contents will be protected. When the user needs to protect certain private contents, the user may click the button to send instructions to the device to starting the process. After the device receives the instructions regarding setting protection for private content, the device may then display an input interface to the user. The user may use the input interface to enter an encrypting password and an invited guest password, before confirming submission of the encrypting password and the invited guest password by clicking a confirmation button in the input interface. After submission of the encrypting password and the invited guest password, the user may select the private contents that need protection, before submitting the selection to the device. As indicated above, the selection and/or identification of private contents that need protection may take different forms and processes. While certain information may be considered "private" by the user, he/she may not consider all of such information need protection. The identification and selection of private content to be protected allows the user the flexibility to choose what will be encrypted and displayed only after a successful decryption.

Step 302: The device, e.g. a mobile terminal, may encrypt the private contents to be protected using the encrypting password, generate encrypted private contents, and store a corresponding relationship between the encrypted private contents and an contents ID in a database to protect the private contents.

In particular, the device may encrypt the private contents using the encrypting password, generate encrypted private contents corresponding to the private contents, enter a corresponding relationship (embodied by an entry) between the encrypted private contents and an contents ID in a content database to protect the private contents. The content database may include at least the contents ID and entry reflecting the relationship between the contents ID and the encrypted private contents. The contents database may further include the encrypted private contents. The contents ID may be entered by the user or generated by a program. The contents ID may be used as an identifying key to point to certain encrypted private contents so that when the decrypting password satisfies all the requirements, the correct encrypted private contents may be identified, decrypted, and displayed.

Step 303: The device, e.g. a mobile terminal, may store the corresponding relationship between the invited guest password and the contents ID, preferably in the contents database.

For example, the device receives from the user an encrypting password (PW11), an invited guest password (PW 12), the private content (Context 1) to be protected, and the contents ID (ID 1). Using the encrypting password PW 1, the device may encrypt the private content Context 1 to be protected and generate encrypted private contents Context 11. After establishing a relationship between the contents ID (ID 1) and the encrypted private contents (Context 11), such a relationship may be entered as an entry into a content database, as shown in Table 1, which may also include possibly additional entries between ID 2 and Context 22, etc. After establishing a relationship between the contents ID (ID 1) and the invited guest password (PW 12), such a relationship may be entered as an entry into a content database, as shown in Table 2, which may also include possibly additional entries between ID 2 and PW 22, etc.

TABLE 2

| Contents ID | Guest Passwords |
|---|---|
| ID 1 | PW 12 |
| ID 2 | PW 22 |
| ... | ... |

Although the encrypting password and invited guest password are presented in singular forms, these passwords may not be a single entry. For example, the encrypting password may be a number of phrases and a match with any of the phrase by the decrypting password may initiate a successful decryption. Moreover, the invited guest password may also be set as a number of phrases. For example, the user may set the invited guest password to be "aa?" wherein "?" may be any character. With such a configuration, when the user enters "aab" or "aa3," such decrypting passwords may all be recognized as an invited guest password. Such a design may provide some flexibility to the user to set up the passwords to manage access.

Note also that through Table 1 and Table 2, a corresponding relationship between a series of information items may be established. For example, contents ID ID 1, encrypting password PW 11, invited guest password PW 12; private contents Context 1, and encrypted private contents Context 11, may all be linked and/or grouped so that a search inquiry with one information item may reveal the others.

Step 304: The device, e.g. a mobile terminal, may receive a request from a user to view the private contents; in particular, the device may receive a contents ID and a decrypting password from a user.

In particular, after receiving the request from a user to view the private contents, the device may display a log-in interface for the user. After the user enters and confirms submission of a decrypting password and a contents ID through the log-in interface, the device may verify the confirmation and receive the decrypting password and the contents ID, which may point to the encrypted private contents to be decrypted. As indicated above, the user that enters the encrypting password may or may not be the same user that enters the decrypting password. In addition, the contents ID may be entered by the user directly or may be generated by a program.

For instance, by requesting to use a certain program, such as a chat platform, the user may send an implicit request he/she intends to access certain private contents and such a request to use the program is automatically accompanied by the provision of a contents ID so that the encrypted private contents may be properly identified.

Alternatively, for instance, the device may display a button that may be used to prompt the user to choose whether the user wants to view private contents that are protected. The user needs may click the button to send requests to the device that the user wants to view the private contents. After the receiving the requests, the device may display a log-in interface to the user. The user may use the long-in interface to enter a decrypting password and a contents ID for the encrypted private contents. The user may then confirm submission of the decrypting password and contents ID to the device by clicking a confirmation button in the log-in interface.

Step 305: The device, e.g. a mobile terminal, may obtain the invited guest password based on the corresponding relationship between the invited guest password and the contents ID. The device may access the contents database, search the database with the contents ID, and identify and obtain the invited guest password.

Step 306: The device, e.g. a mobile terminal, may determine whether the decrypting password is the same as the obtained invited guest password. If they are the same, then the device performs Step 310; if they are not the same, then the device performs Step 307.

Step 307: The device, e.g. a mobile terminal, may identify the encrypted private contents in the database using the contents ID. The device may access the contents database, search the database with the contents ID, and identify the encrypted private contents.

Step 308: The device, e.g. a mobile terminal, may decrypt the encrypted private contents corresponding to the contents ID using the decrypting password. If the decryption is successful, then the device performs Step 309; if the decryption is unsuccessful, then the device performs Step 311.

In particular, if the user provides a correct decrypting password, e.g. the decrypting password being the same as the encrypting password for the encrypted private contents, then the device may be able to decrypt the encrypted private contents successfully and obtain the decrypted private contents, which may be properly displayed. If the user provides a wrong decrypting password, e.g. the decrypting password not being the same as the encrypting password for the encrypted private contents, then the device may not be able to decrypt the encrypted private contents successfully and obtain the decrypted private contents.

As indicated above, the encrypting password may be a number of phrases so that as long as the decrypting password matches any one of them, a successful decryption may be conducted.

Step 309: The device, e.g. a mobile terminal, may display the decrypted private contents when the decryption is successful. End of operation.

In particular, after a successful decryption, the device may obtain the decrypted private contents, create a blank display interface, and load the decrypted private contents into the display interface. In such a manner, the decrypted private contents may be displayed.

For example, after the user enters a decryption password PW 1 and a contents ID ID 1, the device may receive the submission of PW 1 and ID 1 and search for the encrypted private contents using ID 1, as shown in Table 1. In such a manner, the encrypted private contents Context 11 may be properly identified in the contents database. Then the device may decrypt Context 11 using PW 1, which may or may not be correct. If PW 1 is the correct password, the decryption may be successful and the decrypted private contents Context 1 may be obtained by the device. The device may then create a blank interface, load Context 1 into the blank interface and properly display Context 1 and the interface.

It should be noted that the specific approach to display the decrypted private contents herein described may vary according to the specific programs and the nature of the private contents. The user may be able to set how the decrypted private contents, if obtained, will be displayed before or after the decryption is completed. For instance, the user may choose to display only parts of the decrypted private contents or display the contents sequentially for the most effective view.

Step 310: Alternatively, the device, e.g. a mobile terminal, may display a first set of preset contents when the decryption is not successful. End of operation.

In particular, after an unsuccessful decryption, the device may create a blank display interface, and load preset private subjects obtained from the contents database into the display interface, wherein the present private subjects do not overlap completely with the private contents that are being protected.

The preset private subjects may be authentic or fabricated. However, it is preferable that the preset private subjects do not overlap completely with the private contents to be protected. It is possible that the preset private subjects overlap with parts, but not all, of the private contents; or the preset private subjects do not overlap with any part of the private contents. The user, preferably the user entering the encrypting instructions, may be able to choose how to set the private subjects that are to be displayed once the decryption is not successful.

Alternatively, after an unsuccessful decryption, the device may display a preset blank interface or an error message. The blank interface may be configured so that it does not display any contents that may be considered private. The error message denies the user's access.

Step 311: The device, e.g. a mobile terminal, may display a second set of preset contents when the decryption is not successful. End of operation.

The second set of preset contents may be the same as or may be different from the first set of preset contents. Preferably, the second set of preset contents includes a blank interface or an error message, which denies the user's access.

In addition, before carrying out Step 304, the user may enter preset private contents into the device, such as a mobile terminal. The device may receive the preset private contents and store such contents in the contents database.

In summary, in some implementations of the current invention, the device, e.g. a mobile terminal, may receive an encrypting password and the private contents selected by the user. The device may then encrypt the private contents using the encrypting password, generate encrypted private contents, and store a corresponding relationship between the encrypted private contents and a contents ID in a content database to protect the private contents. In addition, the device may receive request from a user to view the private contents; in particular, the device may receive a contents ID and a decrypting password from a user, identify the encrypted private contents in the database using the contents ID, and decrypt the encrypted private contents corresponding to the contents ID using the decrypting password. If the decryption is successful, then the device displays the private contents; if the decryption is unsuccessful, then the device displays preset contents. The private contents are stored in the device in an encrypted form; which may not be viewed by any user before decryption. If the decryption is successful, the decrypted private contents are displayed; if the decryption is not successful, then preset contents are displayed, wherein the preset contents does not overlap with any private contents. Thus, the method herein disclosed improves information security and protection of private contents.

Figure 4:
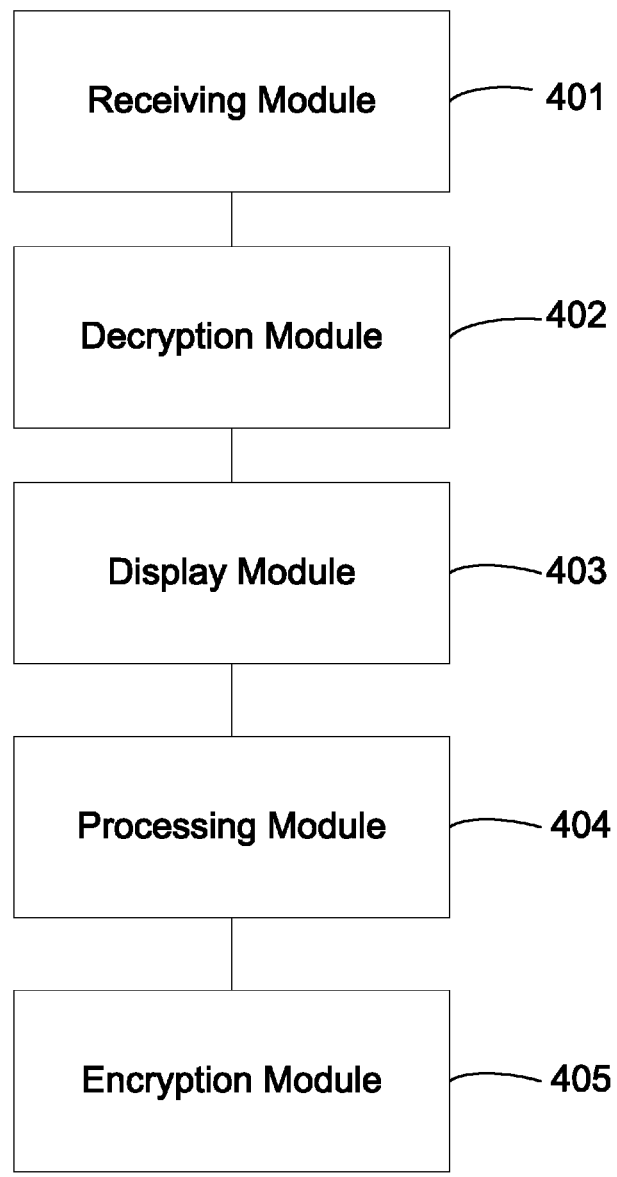
FIG. 4 is a schematic structural diagram of system for decrypting encrypted private contents according to an embodiment.

FIG. 4 is a schematic structural diagram of system for decrypting encrypted private contents according to an embodiment. As indicated by the embodiment shown in FIG. 4, the system may include:

A receiving module 401, configured to receive a decrypting password and a contents ID from a first user.

A decryption module 402, configured to decrypt the encrypted private contents corresponding to the contents ID using the decrypting password; and A display module 403, configured to display the decrypted private contents when the decryption is successful; and display preset contents when the decryption is not successful.

The display module may comprise: a first display unit for displaying the decrypted private contents when the decryption is successful; and a second display unit for displaying the preset contents, wherein the present contents may be blank interface or an artificial user interface showing preset private subjects.

Moreover, the system may further comprise: a processing module 404, configured to determine whether the decrypting password is an invited guest password before decrypting the private contents, The processing module 404 may comprise: an acquiring unit, configured to acquire the invited guest password based on a corresponding relationship between the contents ID and the invited guest password; a comparison unit, configured to compare the decrypting password to the invited guest password; and a third display unit, configured to display the preset contents when the decrypting password is the same as the invited guest password. If the decrypting password is not the invited guest password, the system uses the decrypting password to perform decryption of the encrypted private contents corresponding to contents ID.

In addition, the system may further comprise an encryption module 405, configured to receive an encrypting password from a second user, identify the private contents to be protected in the device, encrypt the private contents using the encrypting password and acquiring the encrypted private contents, and store a corresponding relationship between the encrypted private contents and the contents ID in a database.

Figure 5:
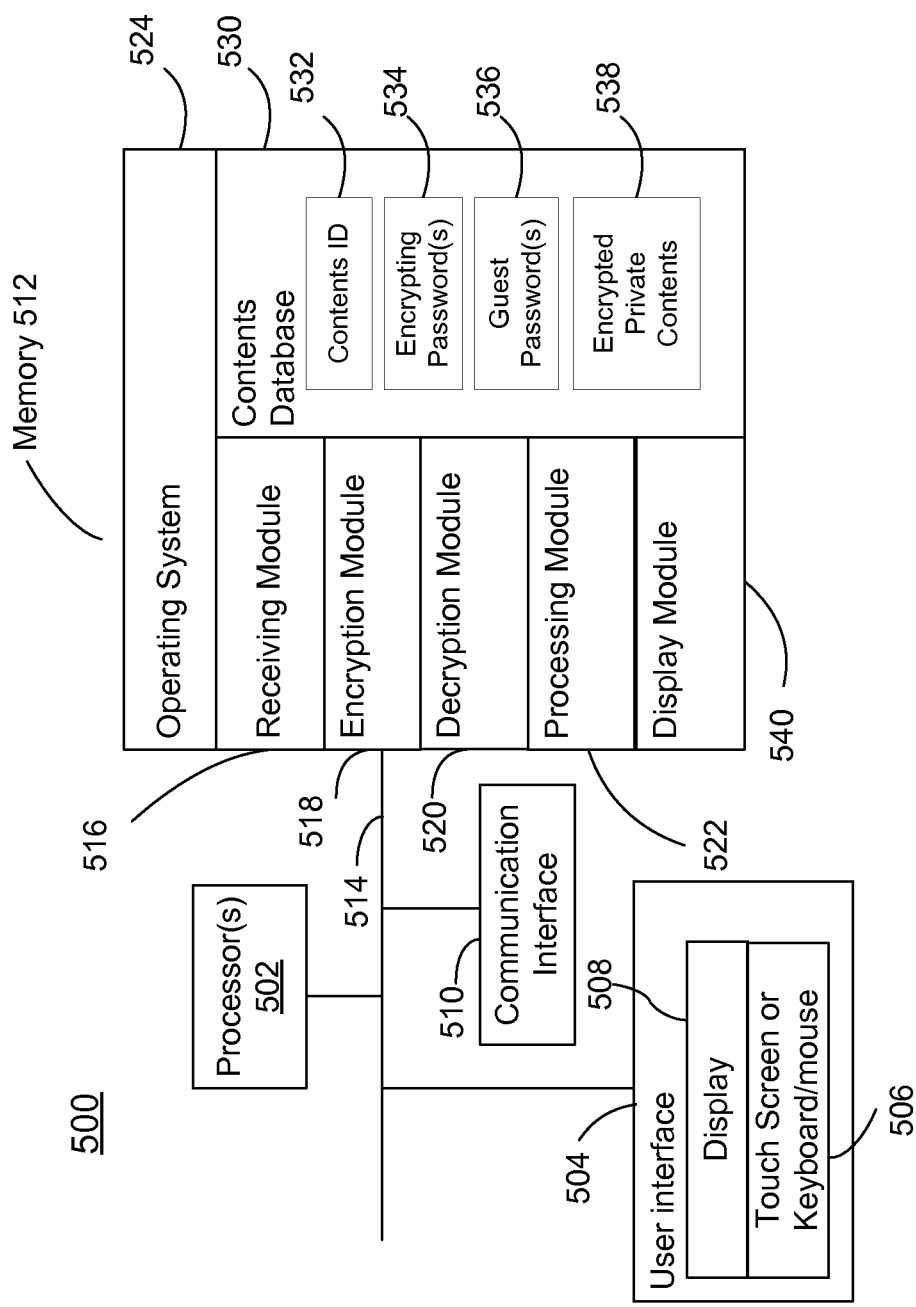
FIG. 5 is a block diagram illustrating different components of an encryption-decryption device (e.g. a mobile terminal such as a smart phone) in accordance with some implementations.

FIG. 5 is a block diagram illustrating different components of an encrypting and decrypting device 500 (e.g. a mobile terminal such as a smart phone) in accordance with some implementations. While certain specific features are illustrated, those skilled in the art will appreciate from the present disclosure that various other features have not been illustrated for the sake of brevity and so as not to obscure more pertinent aspects of the implementations disclosed herein. To that end, the encrypting and decrypting device 500 includes memory 512; one or more processors 502 for executing modules, programs and/or instructions stored in the memory 512 and thereby performing predefined operations; one or more network or other communications interfaces 510; and one or more communication buses 514 for interconnecting these components. In some implementations, the encrypting and decrypting device 500 includes a user interface 504 comprising a display device 508 (e.g. a screen) and one or more input devices 506 (e.g., touch screen or keyboard/mouse). In some implementations, the memory 512 includes high-speed random access memory, such as DRAM, SRAM, or other random access solid state memory devices. In some implementations, memory 512 includes non-volatile memory, such as one or more magnetic disk storage devices, optical disk storage devices, flash memory devices, or other non-volatile solid state storage devices. In some implementations, memory 512 includes one or more storage devices remotely located from the processor(s) 502. Memory 512, or alternately one or more storage devices (e.g., one or more nonvolatile storage devices) within memory 512, includes a non-transitory computer readable storage medium. In some implementations, memory 512 or the computer readable storage medium of memory 512 stores the following programs, modules and data structures, or a subset thereof:

An operating system 524 that includes procedures for handling various basic system services and for performing hardware dependent tasks.

A receiving module 516 that is used to receive information items from a user or other modules and programs. For example, the receiving module may be used to accept user entries, requests, and inquiries. The entries, requests, and inquiries may include informational items such as a contents ID 532 and a decrypting password 536. The entries from the user may be through the user interface or via the communication network interfaces 510 and one or more communication networks (wired or wireless), or other networks and communication routes between different programs and compartments of the device 500, etc.

An encryption module 518 for the encryption of private contents to be protected using the encrypting password 534. the encryption module may be configured to receive an encrypting password 534 from a second user, identify the private contents to be protected in the device, encrypt the private contents using the encrypting password 534, and store a corresponding relationship between the encrypted private contents 538 and the contents ID 532 in the contents database 530.

A decryption module 520 for decrypting the encrypted private contents 538 corresponding to the contents ID 532 using the decrypting password 536.

A processing module 522 for acquiring the invited guest password 536 based on a corresponding relationship between the contents ID 532 and the invited guest password 536; comparing the decrypting password to the invited guest password 536; and instructing the user interface to display the preset contents when the decrypting password is the same as the invited guest password 536. If the decrypting password is not the invited guest password 536, the decrypting module 520 uses the decrypting password to perform decryption of the encrypted private contents 538 corresponding to contents ID 532.

A display module 540 configured to instruct the user interface to display the decrypted private contents when the decryption by the decryption module 520 is successful; and display preset contents when the decryption is not successful.

A contents database 530 including a plurality of user entries and device-generated information items, such as but not limited to: the contents ID 532, the encrypting password(s) 534, the invited guest password(s) 536, and the encrypted private contents 538. The contents database 530 include a single or a plurality of tables detailing the corresponding relationship between the contents ID 532, the encrypting password 534, the invited guest password 536, the encrypted private contents 538, and the preset contents to be displayed. The contents database 530 allows a user to sent inquiries into the database to search and obtain the various information items based on their corresponding relationships.

It should be noted that the modules, databases, and models in the encrypting and decrypting device 500 described above in connection with FIG. 5 may be implemented on a single device (e.g. a single smart phone) or distributed among multiple devices (e.g. a smart phone and one or more computer servers) that are connected by a computer network. Although a specific hardware configuration may affect the performance of the encrypting and decrypting device 500, the implementation of the present application is not dependent on a particular hardware configuration.

FIGS. 6A-6F are exemplary screenshots of how a mobile terminal may receive encrypting settings and processes and display private contents and/or preset contents in accordance with some implementations. While certain specific features are illustrated, those skilled in the art will appreciate from the present disclosure that various other features have not been illustrated for the sake of brevity and so as not to obscure more pertinent aspects of the implementations disclosed herein. FIGS. 6A-6F use the screen shots of a mobile terminal (e.g. a smart phone) as an example to show how the private contents are selected, encrypted, and decrypted, and displayed. However, it should be noted that in actual implementations, the embodiments shown in FIGS. 6A-6F may not be utilized in the order as shown here and may be presented as alternatives based on the user's selection and the mobile terminal's settings.

FIG. 6A illustrates the setup screen before the encryption, allowing a user to initialize the protection of private contents on the mobile terminal. The mobile terminal screen in FIG. 6A includes a title panel 601, a private contents selection panel 603, an encrypting password setup panel 607, an invited guest password setup panel 605, and a preset contents setup panel 609. As indicated above, the presence and absence of the panels may vary according to the specific settings of the terminal device and choices of the user. The various panels may be shown in a single screen as illustrated here or in a number of sequentially presented screens.

The title panel 601 provides a summary of the actions to be taken and gives notice to the user as to the general goal of the actions. Here the title panel 601 includes "Private Contents Setup" and it is clear that other phrases may be used. The title panel 601 also suggest that the setup process to be taken by the user is not limited to a particular program and may cover all the private contents used by any or all the programs, already installed or to be installed, in the mobile terminal. Such a format may also vary so that the private contents setup may cover only one program.

The private contents selection panel 603 allows the user to select what kind of private contents are to be protected and encrypted. In the private contents selection panel 603 the user may choose from a number of private contents items. The private contents selection panel 603 in FIG. 6A shows several such items such as "names" and "date & time." However, it is clear that the private contents items shown in FIG. 6A are only exemplary. Other implementations of the current invention may have different sets of private information items, presented in a much more detailed and/or complete manner. In addition, some the information items may overlaps with one another. For example, "Chat history" may include some names and pictures, whereas not all the names and pictures are in the chat history. In the embodiment shown in FIG. 6A, the user is allowed to choose multiple private contents items to ensure full protection and flexible choices.

It should also be noted that selecting what private contents will be protected, as shown in FIG. 6A, is only one exemplary approach to specify the range of protection. The mobile terminal may allow the user to enter the private contents to be protected through a special interface, or give the user the chance to make his/her choices in a more dynamic and flexible manner.

After the user makes his/her selections in the private contents selection panel 603, he/she may choose to submit the selections by pressing the "Submit" button.

The encrypting password setup panel 607 includes fields for the user to enter and re-enter (confirm) the encrypting password. The encrypting password, as indicated above, may be used to encrypt the private contents to be protected.

The invited guest password setup panel 605 includes fields for the user to enter and re-enter (confirm) the invited guest passwords. The invited guest passwords, as indicated above, may be used to trigger the display of preset contents. The invited guest password may be one single password or a series of passwords. For example, the user may enter "aa?" to make all the three-letter phrases starting with "aa" to be valid invited guest passwords. Preferably, the encrypting password does not overlap with any invited guest password(s).

With the invited guest password, the owner of the device (e.g. smart phone) may have the flexibility to allow other users to use the device without disclosing private contents that the owner wants to protect. For example, if friend wants to use the owner's smart phone to send an emergency text message, the owner may just tell his/her friend the invited guest password, allowing the friend to access the text message program without showing any private contents such as names or previous texting records.

The preset contents setup panel 609 allows the user to enter preset contents if the user wishes such contents to be displayed. The user may choose to display a blank interface by making no entries in panel 609.

As indicated above, the program may be set up in such a manner that the device display one set of preset contents (Contents A) when the decrypting password matches the invited guest password but not the encrypting password, and another set of preset contents (Contents B) when the decrypting password matches neither the invited guest password nor the encrypting password. Contents A and Contents B may be the same or different. The program may be set up so that Contents B by default includes a blank interface or error message and Contents A includes what the user enters through the pre-set contents setup panel 609. Alternatively, the preset contents setup panel may be more detailed and sophisticated so that the user may enter two different sets of preset contents to be displayed. Contents A and/or Contents B may also include contents that are generally considered private. For example, Contents A may include private subjects that the user did not choose as private contents to be protected. In this case, the private subjects do not overlap with the private contents that are protected, though the private subjects may include information that the user setting the passwords considers to be private but not needing protection. The preset contents panel may include more fields so that the user may make more complex entries that may be displayed.

FIG. 6A does not include an entry field for a contents ID. However, as noted above, it is possible that the user enters the contents ID, which may be paired with the private contents to be protected, the encrypting password, and the decrypting password. If that is the case, a panel or entry field may be displayed so that the user may enter the contents ID. Similarly in FIG. 6B, there may be an additional field where a contents ID may be entered. In the embodiment shown in FIG. 6A, the contents ID may be automatically generated by the program and the corresponding relationships between the contents ID and the various information items may be stored into the contents database.

FIG. 6B illustrates the log-in screen for a chat program. Here the chat program is used as an example as to how the decryption process may be managed. The screen shown in FIG. 6B includes a Chat Program Login title panel 630 and the password entering panel 640.

The title panel 630 provide notice to the notice that he/she is logging into the Chat Program to continue and/or start a chat. As indicated above, any other programs that utilizes any private contents may be protected by such a log-in process.

The password entering panel 640 allows the user, which may or may not be the same user providing the encrypting information, to enter the decrypting password. The access to the Chat Program may automatically triggers the log-in process and the contents ID may be automatically retrieved so that the encrypted private contents may be identified. As indicated above, another approach is to have a contents ID field so that the user may enter a contents ID.

Figure 6D:
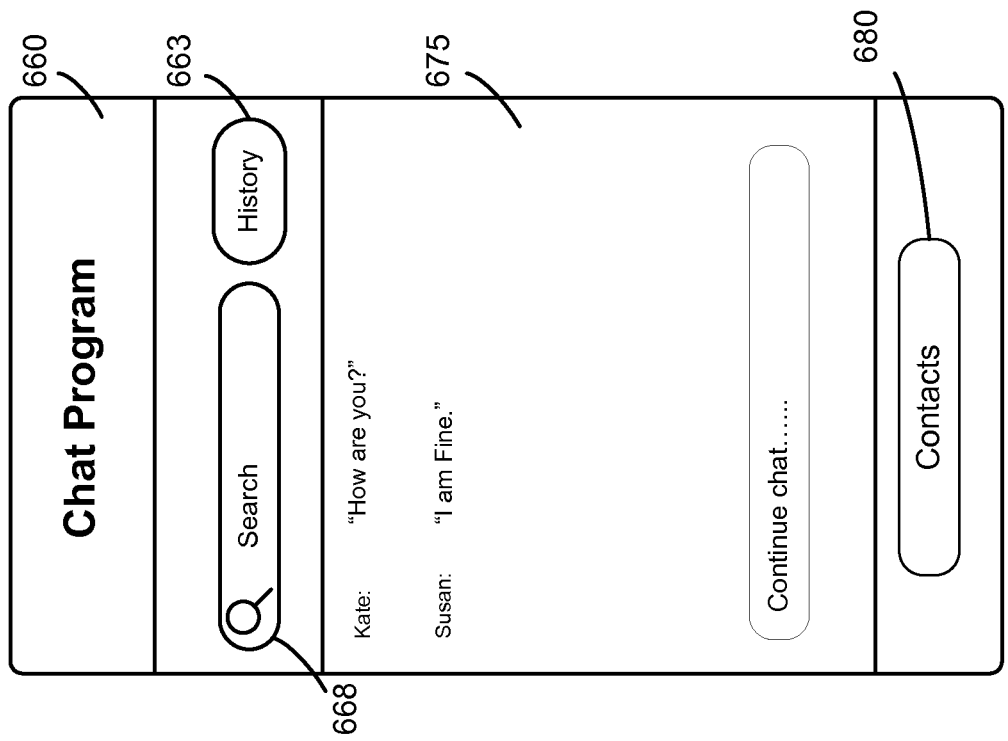

The decrypting password entered by the user is first matched with the invited guest password(s). If the decrypting password is the same as an invited guest password, the preset contents are displayed, as shown in FIG. 6D.

If the decrypting password is not the same as the invited guest password(s), an attempt is then made to decrypt the encrypted private contents using the decrypting password. If the decryption is successful (e.g. when the decrypting password is the same as the encrypting password), then the decrypted private contents are properly displayed, as shown FIG. 6C. The user that enters the matching decrypting password may also be allowed to view and display the decrypted private contents are not displayed. If the decryption is not successful (e.g. when the decrypting password is not the same as the encrypting password), then the private contents are not displayed and the preset contents, which may or may not be the same as the preset contents after an invited guest password match, may be displayed, as shown in FIG. 6E.

Figure 6C:
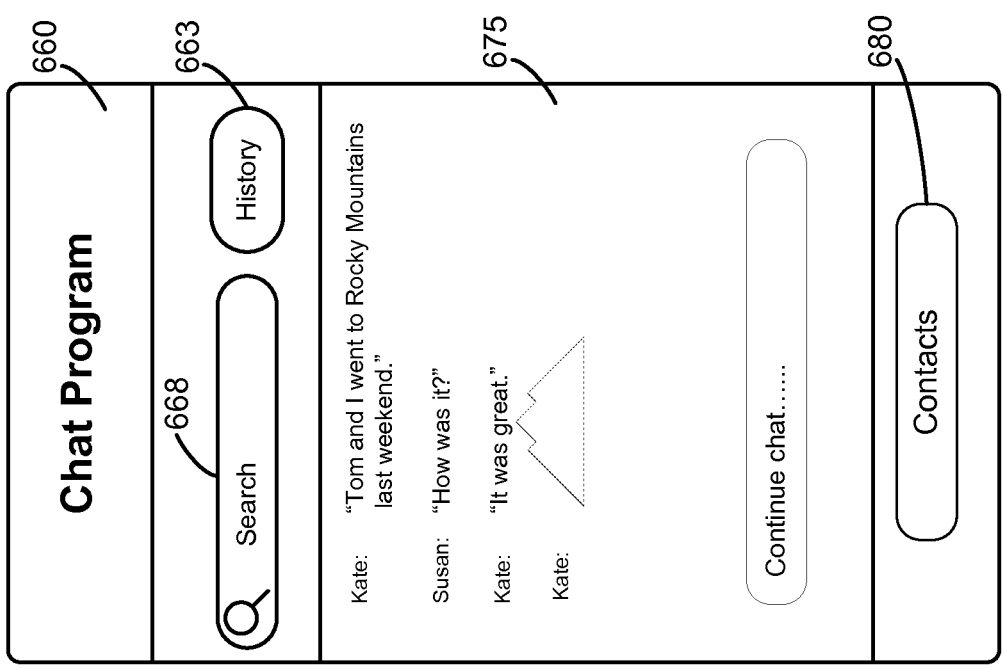

FIG. 6C illustrates the display screen for the chat program when the decrypting password matches the encrypting password. The screen shown in FIG. 6C includes a title panel 660, a search field 668, a history button 663, a contents panel 675, and a contacts button 680.

As indicated above, the chat program is used as an example and the name shown in the title panel 660 may vary according to the name of the program that needs protection for private contents.

The search field 668 allows the user of the Chat Program to search the program for information related to the search entry. In the embodiment shown in FIG. 6C, wherein the decryption is successful, the user may have full access to all the information related to the Chat Program, including the decrypted private contents.

The history button 663 allows the user to access all the chat history stored in the Chat Program. In the embodiment shown in FIG. 6C, wherein the decryption is successful, the user may have full access to chat history, which may include parts or all of the decrypted private contents.

The contacts button 680 allows the user to access all the contacts stored in the Chat Program. In the embodiment shown in FIG. 6C, wherein the decryption is successful, the user may have full access to the contacts, which may include parts or all of the decrypted private contents.

The contents panel 675 illustrates some conversation of the previous chat and allows the user to continue the chat. The displayed conversation shown in the contents panel 675 may include parts or all of the decrypted private contents.

Figure 6F:
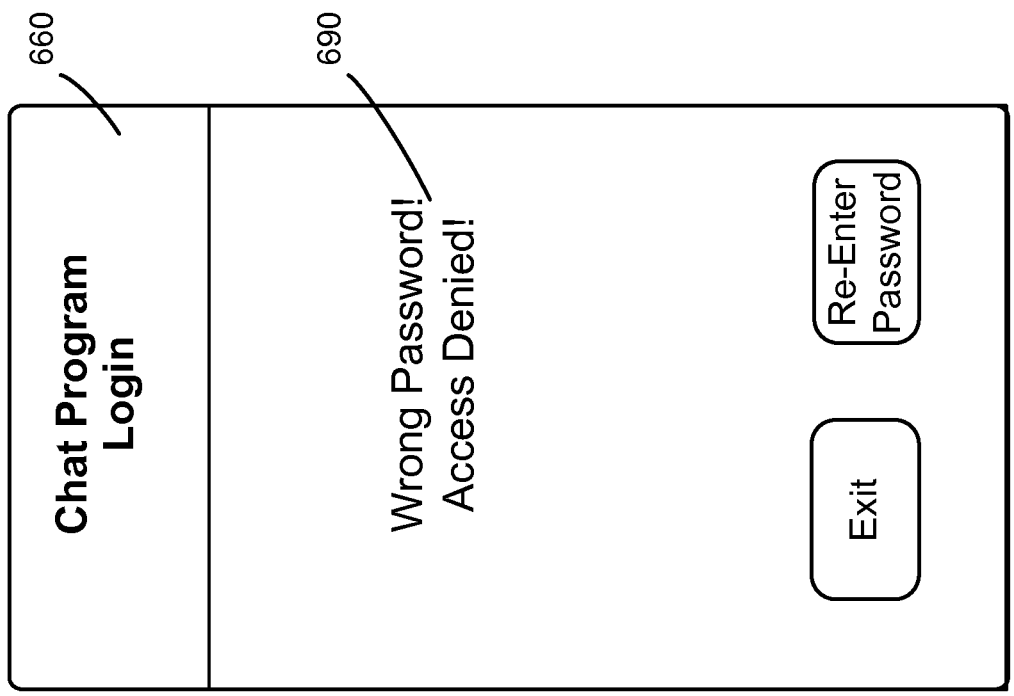
Figure 6E:
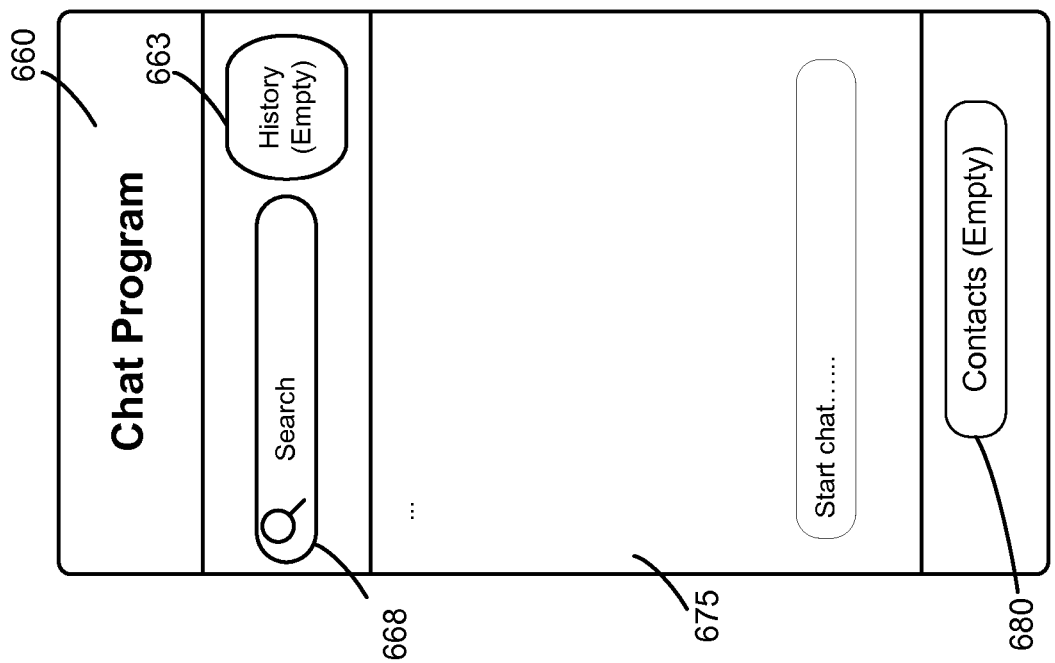

It should be noted that the format and display of the information items displayed in FIG. 6C, as well as in FIGS. 6D, 6E and 6F, may vary according to the setting of the program and the preference of the user. For example, the contents panel 675 may include more or less fields so that more or less decrypted private contents may be displayed.

FIG. 6D illustrates the display screen for the chat program when the decrypting password matches the invited guest password but not the encrypting password. The screen shown in FIG. 6D includes a title panel 660, a search field 668, a history button 663, a contents panel 675, and a contacts button 680.

The key difference between what is shown in FIG. 6D, compared to the showing of FIG. 6C, is that all the accessible contents through the search field 668, the history button 663, the contacts button 680, and the contents panel 675, are all preferably preset contents. The preset contents may be provided by the user, or by the program automatically. In other words, the Chat Program may display fake or fabricated information when the decrypting password matches with the invited guest password(s). Alternatively, the Chat Program may display contents are generally authentic or even may be considered private but user did not choose to protect.

For instance, the displayed conversation in the contents panel 675 may only include contents fabricated and entered by the user setting up the preset contents. Or the conversation in the contents panel 675 may include some authentic information (e.g. names "Kate" and "Susan") but not all. As indicated above, the user who set up the preset contents may select some private contents to protect but leave some out. The unselected contents may be included in the preset contents that are displayed when the decrypting password matches the invited guest password. Preferably the preset contents do not overlap complete with the private contents to be protected.

As indicated above, the incorporation of invited guest passwords give the owner or primary user of the device the flexibility to allow others to use the device or certain programs of the device without disclosing private information. An additional step that may be incorporated in the current invention is to delete all or part of the contents generated by the guest user. For example, all the guest user enters the invited guest password and uses the Chat Program, his/her chat history is deleted after his/her use—after he/she logs off or close the program. The range of deletion may vary according to the setup. For instance, either all the contents may be deleted or only the private contents generated by the guest user may be deleted. In such a manner, the privacy of the guest user is also protected.

FIG. 6E illustrates a possible display screen for the chat program when the decrypting password matches neither the invited guest password nor the encrypting password. The screen shown in FIG. 6E includes a title panel 660, a search field 668, a history button 663, a contents panel 675, and a contacts button 680.

The key difference between what is shown in FIG. 6E, compared to the showings of FIGS. 6C and 6D, is that there is no user-entered information that is displayed or accessible. FIG. 6E shows essentially a blank Chat Program. The user may not view or access any existing contents through the search field 668, the history button 663, the contacts button 680, or the contents panel 675. Similar to FIG. 6D, FIG. 6E is displaying preset contents. However, the preset contents here results in a blank interface. As indicated above, the preset contents shown in FIG. 6E may be set by default or by a deliberate choice of the user. The preset contents may be entered by the user, or generated automatically.

FIG. 6F illustrates another possible display screen for the chat program when the decrypting password matches neither the invited guest password nor the encrypting password. The screen shown in FIG. 6F includes a title panel 660 and an error message 690.

As an alternative to FIG. 6E, FIG. 6F shows an error message completely denies access to the Chat Program. The error message, the exact format of which may be altered, is the preset contents. The preset contents may be entered by the user, or generated automatically.

Reference has been made in detail to implementations, examples of which are illustrated in the accompanying drawings. While particular implementations are described, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method for decrypting encrypted private contents stored in a device, comprising:
    at the device having one or more processors, memory for storing program modules to be executed by the one or more processors, and a display:
    receiving, at the device, a contents ID and a decrypting password from a first user of the device;
    querying, at the device, a content database for an invited guest password associated with the contents ID;
    comparing, at the device, the decrypting password with the invited guest password;
    when the decrypting password is the same as the invited guest password:
        displaying, on the display, first preset contents;
    when the decrypting password is not the same as the invited guest password:
        when the decrypting password is the same as an encrypting password associated with the encrypted private contents:
            decrypting the encrypted private contents corresponding to the contents ID using the decrypting password; and
            displaying, on the display, the decrypted private contents; and
        when the decrypting password is not the same as the encrypting password associated with the encrypted private contents:
            displaying, on the display, second preset contents.

2. The method for decrypting encrypted private contents according to claim 1, wherein:
    the second preset contents comprise a blank user interface; or
    the first preset contents comprise an artificial user interface, wherein the artificial user interface displays preset private subjects not completely overlapping with the private contents.

3. The method for decrypting encrypted private contents according to claim 1, further comprising:
    receiving the encrypting password from a second user of the device;
    identifying the private contents to be protected in the device;
    encrypting the private contents using the encrypting password and generating encrypted private contents; and
    storing a corresponding relationship between the encrypted private contents and the contents ID in the database.

4. The method for decrypting encrypted private contents according to claim 1, further comprising:
    receiving the encrypting password from a second user of the device;
    identifying the private contents to be protected in the device;
    encrypting the private contents using the encrypting password and generating encrypted private contents; and
    storing a corresponding relationship between the encrypted private contents and the contents ID in the database.

5. The method for decrypting encrypted private contents according to claim 1, further comprising:
    acquiring the invited guest password based on a corresponding relationship between the contents ID and the invited guest password.

6. The method for decrypting encrypted private contents according to claim 1, wherein:
    the second preset contents include an error message.

7. A system for decrypting encrypted private contents, comprising:
- a receiving module, configured to receive a decrypting password and a contents ID from a first user of the system;
- a processing module, configured to query a content database for an invited guest password associated with the content ID and compare the decrypting password with the invited guest password;
- a decryption module, configured to decrypt the encrypted private contents corresponding to the contents ID using the decrypting password; and
- a display module, configured to display the decrypted private contents when decryption is successful the decrypting password is not the same as the invited guest password and the decrypting password is the same as an encrypting password associated with the encrypted private contents; display first preset contents when the decrypting password is the same as the invited guest password; and display second present contents when the decrypting password is not the same as the invited guest password and the decrypting password is not the same as the encrypting password associated with the encrypted private contents.

8. The system for decrypting encrypted private contents according to claim 7, wherein the display module comprises:
- a first display unit for displaying the decrypted private contents when the decryption is successful;
- and a second display unit for displaying the first preset contents or the second preset contents.

9. The system for decrypting encrypted private contents according to claim 7, further comprising:
- an encryption module, configured to receive the encrypting password from a second user of the system, identify the private contents to be protected in the device, encrypt the private contents using the encrypting password and generating the encrypted private contents, and store a corresponding relationship between the encrypted private contents and the contents ID in the database.

10. A method for protecting private contents stored in a device, comprising:
- at the device, wherein the device includes one or more processors, memory for storing program modules to be executed by the one or more processors, and a display:
  - receiving, at the device, a contents ID and a decrypting password from a first user of the device;
  - acquiring, at the device, from a content database an invited guest password based on a corresponding relationship between the contents ID and the invited guest password; and
  - comparing the decrypting password to the invited guest password,
  - displaying, on the display, a first set of preset contents when the decrypting password is the same as the invited guest password;
  - decrypting the encrypted private contents when the decrypting password is not the same as the invited guest password,
  - displaying the decrypted private contents when the decrypting password is the same as an encrypting password; and
  - displaying, on the display, a second set of preset contents when the decrypting password is not the same as the encrypting password.

11. The method for protecting private contents according to claim 10, wherein before the step of receiving a contents ID and a decrypting password from a first user, the method further comprises:
- receiving the encrypting password and the invited guest password from a second user of the device;
- identifying the private contents to be protected in the device;
- encrypting the private contents using the encrypting password and generating the encrypted private contents;
- storing a corresponding relationship between the encrypted private contents and the contents ID in the content database.

12. The method for protecting private contents according to claim 10, wherein the first set of preset contents comprises private subjects not completely overlapping with the decrypted private contents.

13. The method for protecting private contents according to claim 10, wherein the second set of present contents is empty.

14. The method for protecting private contents according to claim 10, wherein the second set of present contents is an error message.

15. The method for protecting private contents according to claim 10, further comprising:
- deleting all the private contents generated by the first user after a use by the first user if the decrypting password is an invited guest password.

\* \* \* \* \*